March 23, 1926.

W. F. KAISER

FRUIT JAR VISE

Filed April 30, 1924

W. F. Kaiser INVENTOR

BY Victor J. Evans ATTORNEY

March 23, 1926.

W. F. KAISER 1,578,134

FRUIT JAR VISE

Filed April 30, 1924    2 Sheets-Sheet 2

W. F. Kaiser
INVENTOR

BY Victor J. Evans
ATTORNEY

Patented Mar. 23, 1926.

1,578,134

UNITED STATES PATENT OFFICE.

WILLIAM FREDERICK KAISER, OF ARCHER, IOWA.

FRUIT-JAR VISE.

Application filed April 30, 1924. Serial No. 710,087.

*To all whom it may concern:*

Be it known that I, WILLIAM F. KAISER, a citizen of the United States, residing at Archer, in the county of O'Brien and State of Iowa, have invented new and useful Improvements in Fruit-Jar Vises, of which the following is a specification.

This invention contemplates the provision of a vise primarily intended for domestic use, and designed to clamp Mason jars or the like to hold them stationary while the cap is being effectively tightened, or removed therefrom.

In carrying out the invention, it is my purpose to provide a device of the above mentioned character which is simple in construction, and one designed to permit of its use with jars of different diameters.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
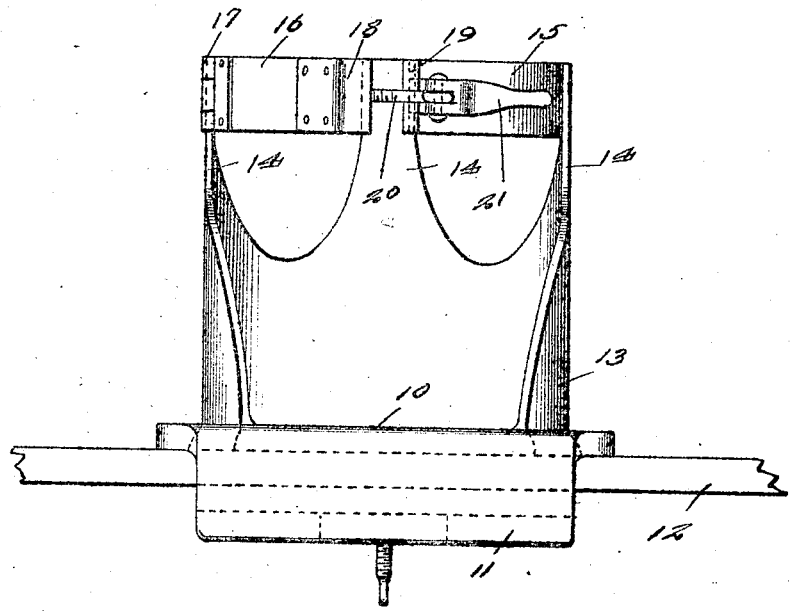
Figure 1 is a view showing the device clamped to a support.
Figure 2:
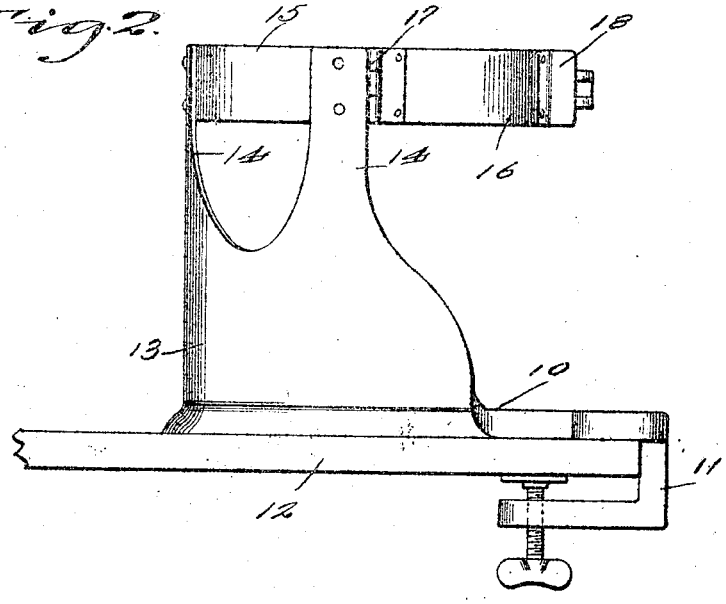
Figure 2 is a view taken at a right angle to Figure 1.
Figure 3:
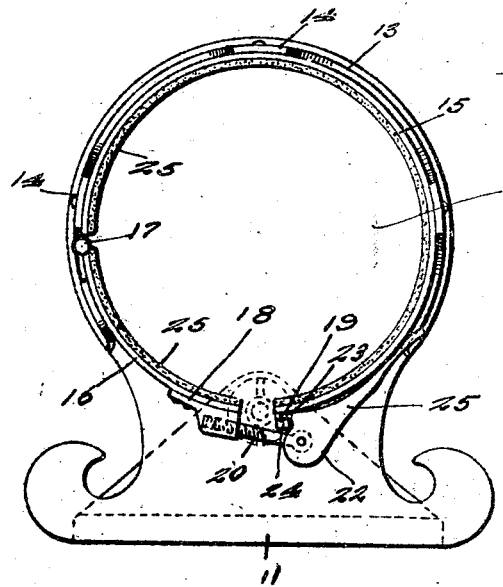
Figure 3 is a fragmentary perspective view of the device.

The device forming the subject matter of the present invention includes a base 10 which is preferably circular and projecting from the forward edge of this base is a substantially U-shaped clamp 11 designed to embrace the edge of a table top, shelf or other suitable support indicated at 12. Rising from the edge of the base at a point diametrically opposite the clamp 11 is a curved wall 13, which terminates at its upper end to provide a plurality of spaced upright fingers 14. These fingers support an adjustable band made up of two hingedly connected sections 15 and 16 respectively. The section 15 of this band is secured to the finger 14, while the section 16 is susceptible of adjustment with relation to the first section 16 by reason of its hinged connection therewith as at 17. Secured to the respective sections adjacent the meeting ends thereof are plugs 18 and 19, the former being provided with a bore to accommodate the threaded shank 20 of the element upon which is pivotally supported the lever 21. This lever is provided with a cam shaped extremity 22 from which projects a lug 23, and the lug is adapted to be received by the hook like portion 24 formed on the adjacent plug 19. By reason of this construction, the section 16 of the band can be held in clamping relation with the stationary section 15 when the lever 21 is arranged against the section 16, and by adjusting the element 19 within its plug 18, the relation of the lug and hook can be varied so as to cause the band to more effectively engage the jar should the same be desired.

In practice, the Mason fruit jar or the like is arranged upon the base 10, with the band disposed to embrace the jar at an appropriate point in its height. When the band 16 is swung into clamping position, and held in this position by means of the lever 21, the jar is effectively engaged by said band and held stationary upon the base, so that a wrench can be conveniently used for the purpose of either effectively tightening the cap upon the jar or removing the cap therefrom. The respective sections of the band are preferably lined with rope, felt or other suitable material indicated at 25.

Figure 4:
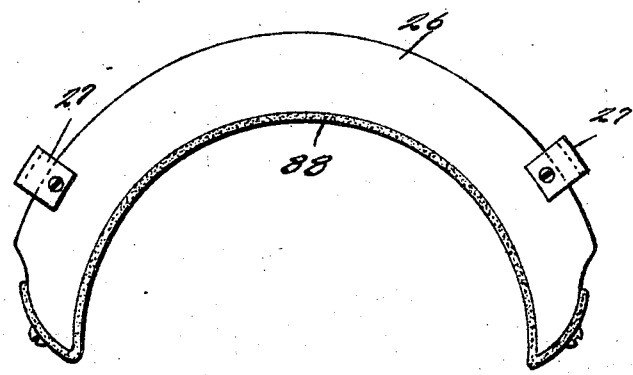
Figure 4 is a view of one of the members adapted to be associated with the device when used with different size jars.
Figure 5:
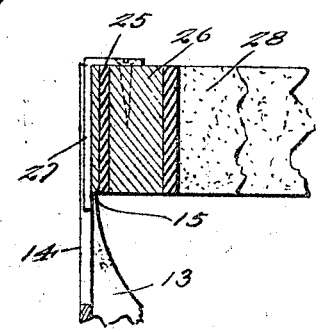
Figure 5 is a fragmentary view showing the manner of associating the member shown in Figure 4 with the device for use.

In order to permit of the use of the device with jars of different diameters, the invention contemplates the provision of one or more members of the character shown in Figure 4, wherein it will be noted that the member is curved or segmental shape, and provided with hooks 27 which rise from the outer edge of the member and is adapted to engage the upper edge of the section 15 of the band. The member just referred to is indicated at 26 and has its inner edge covered with a strip of rubber, felt or other suitable material indicated at 28 so that a more effective purchase may be had upon the jar when the member is arranged in clamping relation with the section 15. Manifestly, by using the members of the character just described, but of relatively different sizes, and supporting these members upon a movable section 16 of the band, the jar receiving opening can be varied as the occasion may require, and the jar effectively clamped between the stationary section 16 of the band and the particular member carried by the section 16. The member 26 is preferably constructed from wood, although any other material may be used.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A device of the character described comprising a base, a curved wall rising therefrom, and cut away to provide a plurality of spaced parallel fingers, a clamping band including a fixed section supported by said fingers, and a movable section hingedly connected with one end of the fixed section, cooperating means carried by the free ends of the respective sections for holding the latter in clamping relation, a segmental shaped member corresponding to the curvature of said band, and hooks projecting from one edge of the member and adapted to engage the upper edge of the band, whereby said member is suspended from said band and supported thereon to vary the diameter of the band for the purpose specified.

In testimony whereof I affix my signature.

WILLIAM FREDERICK KAISER.